United States Patent [19]

Brown, Jr. et al.

[11] 4,005,023
[45] Jan. 25, 1977

[54] SILICONE FLUID USEFUL AS A BRAKE FLUID

[75] Inventors: Edgar D. Brown, Jr., Schenectady; Frank J. Traver, Troy, both of N.Y.

[73] Assignee: General Electric Company, Waterford, N.Y.

[22] Filed: Aug. 25, 1975

[21] Appl. No.: 607,494

Related U.S. Application Data

[60] Continuation-in-part of Ser. No. 368,479, June 11, 1973, abandoned, which is a division of Ser. No. 290,075, Sept. 18, 1972, abandoned.

[52] U.S. Cl. .................................. 252/78.3; 252/79
[51] Int. Cl.² ........................................... C01M 3/44
[58] Field of Search .......... 252/78, 79, 49.6, 56 D, 252/78.3

[56] References Cited

UNITED STATES PATENTS

| | | |
|---|---|---|
| 2,398,187 | 4/1946 | McGregor et al. .................. 252/78 |
| 2,555,721 | 6/1951 | Wiener ................. 252/78 |
| 3,145,175 | 8/1964 | Wright .............. 252/389 R |
| 3,234,131 | 2/1966 | Morway ................ 252/56 D X |
| 3,288,714 | 11/1966 | Osuch .................. 252/56 D X |
| 3,671,433 | 6/1972 | Brenner .................. 252/56 D X |
| 3,833,505 | 9/1974 | Brown ................. 252/78 |

*Primary Examiner*—Harris A. Pitlick
*Attorney, Agent, or Firm*—John L. Young; E. Phillip Koltos; Frank L. Neuhauser

[57] ABSTRACT

There is provided by the present invention, a silicone fluid useful as a hydraulic fluid and more particularly useful as a brake fluid for vehicles.

This silicone fluid comprises generally a linear diorganopolysiloxane having a viscosity at 25°C of 20 to 500 centistokes in combination with carboxylic acid anhydrides as water tolerance additives. Various materials and additives can be added to such a silicone fluid so as to improve its properties as a hydraulic fluid.

7 Claims, No Drawings

SILICONE FLUID USEFUL AS A BRAKE FLUID

BACKGROUND OF THE INVENTION

This application is a continuation-in-part of parent case Ser. No. 368,479, filed on June 11, 1973 and now abandoned, which is a division of application Ser. No. 290,075, filed Sept. 18, 1972, and now abandoned.

The present invention is related to silicone fluids useful as hydraulic fluids and more particularly the present invention relates to a silicone fluid with or without additives added thereto which silicone fluid mixture may be used as a brake fluid.

At the present time, the most common type of hydraulic fluids and more particularly brake fluids that are sold commercially are glycol based polyether fluids. Such commercial brake fluids are operative at most temperatures, that is, experienced in hydraulic systems and particularly in the braking system of an automobile. However, recently it has been discovered that under periods of stress certain portions of the braking system of an automobile may be exposed to excessively high temperatures which results also in the brake fluid being exposed to these high temperatures. In some cases, it has been found that these high temperatures exceed the flash point of commercial brake fluids. In addition, it has been discovered that commercial brake fluids such as the glycol based polyether brake fluids are not as chemically stable and do not have as high a boiling point as well as chemical stability at high temperatures as would be desirable. Accordingly, automobile manufacturers as well as others have looked into the use of other types of fluids as hydraulic fluids and particularly as brake fluids in an automobile.

While it is conceivable that many types of hydraulic fluids can be used in automobiles which hydraulic fluids would have superior high temperature properties than that evidenced by the glycol based polyether fluids, a constant deterrent into the use of such superior hydraulic fluids has been the cost of manufacturing such fluids. Thus, it is highly desirable to discover a hydraulic fluid useful as a brake fluid which has superior high temperature properties, that is, has a high flash point, a very high boiling point and exceptionally good chemical stability at high temperatures.

Another undesirable property of the present commercial brake fluids is their hygroscopicity in that such brake fluids will absorb a large amount of moisture from the air. As a result of the absorbtion of such moisture from the air the resulting brake fluid becomes very viscous. It has been particularly noticed that commercial brake fluids with the amount of moisture that they absorb from the air will cause such brake fluids to have excessively high viscosities at low temperatures and particularly at temperatures such as, minus 40° C, such that such brake fluids are not particularly desirable for use in artic climates or in climates which experience exceptionally cold weather during parts of the year. Accordingly, it is highly desirable to develop a hydraulic fluid and particularly a silicone hydraulic brake fluid which will not be hygroscopic and which will have the proper viscosity at low temperatures and even at abnormally low temperatures.

Silicone fluids have been suggested for use as hydraulic fluids and more particularly as brake fluids. See, for instance, the patent applications of Frank J. Traver, Ser. No. 132,556, now U.S. Pat. No. 3,725,287; Ser. No. 125,398, now U.S. Pat. No. 3,859,321, and Ser. No. 125,397, filed Mar. 17, 1971, and now abandoned. However silicone fluids such as those suggested in the above patent applications were not found to be produced at the present time as economically as would be desired.

Accordingly, it is one object of the present invention to provide for a silicone fluid which can be used as a hydraulic fluid and more particularly can be used as a brake fluid in vehicles which silicone fluid can be produced economically.

It is another object of the present invention to provide a novel silicone fluid useful as a brake fluid in automobiles which silicone fluid is non-hygroscopic.

It is an additional object of the present invention to provide a silicone fluid useful as a brake fluid which silicone fluid has an exceptionally low viscosity at low temperatures particularly in combination with certain additives.

It is yet another object of the present invention to provide a silicone fluid useful as a brake fluid which silicone fluid has exceptionally superior high temperature properties such as, its boiling point, its flash point and its chemical stability at high temperatures, as compared to other commercial brake fluids or other silicone hydraulic fluids.

These and other objects of the present invention are accomplished by means of the silicone fluid and the various additives that may be added to it which are set forth below.

It should be understood that the present invention is not solely limited to a silicone fluid or fluids for use solely in the hydraulic system of the brake system of an automobile, but that the silicone fluid or fluids defined below are directed generally to be used as hydraulic fluid mixture for all types of hydraulic systems. More particularly, the silicone fluid and the silicone fluids mixture defined below are directed for being used in the hydraulic system of the brake system of a vehicle. This includes the brake system of all types of vehicles such as, passenger automobiles, trucks and etc.

SUMMARY OF THE INVENTION

In accordance with the above object there is provided by the present invention a hydraulic fluid system having hydraulic reservoir means, hydraulic pressure activating means, hydraulic pressure activated means and hydraulic line means connecting said hydraulic pressure activated means with said hydraulic pressure activating means and said hydraulic reservoir means comprising the improvement wherein said hydraulic line means, said hydraulic reservoir means, said hydraulic pressure activating means and said hydraulic pressure activated means are substantially filled with a hydraulic fluid comprising a linear silicone fluid of the formula,

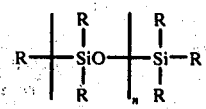

(1)

where $n$ varies from 1 to 2000 and R is selected from the class consisting of monovalent hydrocarbon radicals, halogenated monovalent hydrocarbon radicals and cyanoalkyl radicals and the viscosity of the fluid varies from 20 to 500 centistokes at 25° C. Preferably, all the R radicals on the polymer are the same although they do not necessarily have to be so and preferably such radicals are selected from lower alkyl radicals of 1 to 8 carbon atoms such as, methyl, ethyl and etc.

To improve the water compatibility of the above fluid which water may come into contact with the fluid accidentally since the above fluid is non-hygroscopic, there may be added to 60 to 95% by weight of the above fluid, 5 to 40% by weight of the fluid of a water tolerance additive and more preferably 10 to 20% by weight of the water tolerance additive. Such a water tolerance additive should be selected from glycol polyethers, aliphatic alcohols, silane esters, boron esters, carboxylic acid anhydrides, and polysiloxane copolymers having therein ester or amine functionality. In addition, there may be added to said fluid various amounts of rubber swell additives, anti-oxidant additives, and other additives to result in a hydraulic silicone fluid mixture which is particularly suited for a particular braking system or a particular hydraulic system.

It is noted that the comments above in defining the hydraulic system refer generally to the basic components of a hydraulic system and more particularly the hydraulic system of an automobile. Thus, the hydraulic pressure activating means refers to the apparatus or piston by which mechanical force is translated to pressure on the hydraulic fluid. The hydraulic activated means is the apparatus or equipment such as the brake drum and pistons in the brake drum cylinder by which the hydraulic pressure is translated back into mechanical pressure. There necessarily is also the hydraulic line means connecting the activated means with the activating means and there may also be a reservoir means although such a reservoir means is not strictly necessary. It should be pointed out that the above means language is applicable to all types of braking systems irrespective of whether the system is a brake drum system or disc brake system or other type of braking system that may be used in automobiles and other types of vehicles.

DESCRIPTION OF THE PREFERRED EMBODIMENT

The radical R appearing in Formula (1) above is well known in the art and is typified by radicals usually associated with silicon-bonded organic groups.

The organic radicals represented by R include monovalent hydrocarbon radicals, halogenated monovalent hydrocarbon radicals, and cyano alkyl radicals. Thus, the radical R may be alkyl such as methyl, ethyl, propyl, butyl, octyl; aryl radicals such as phenyl, tolyl, silyl and ethyl radicals; aralkyl radicals such as benzyl, phenyl, phenylethyl radicals; olefinically unsaturated monovalent hydrocarbon radicals such as vinyl, allyl, cyclohexyl radicals; cycloalkyl radicals such as cyclohexyl, cycloheptyl radicals; halogenated monovalent hydrocarbon radicals such as, chloromethyl, dichloropropyl, 1,1,1-trifluoropropyl, chlorophenyl, dibromophenyl and other such radicals; and cyanoalkyl radicals such as cyanoethyl, cyanopropyl and etc. Preferably, the R radical in the compound of formula (1) above is selected from lower alkyl radicals of 1 to 8 carbon atoms and more preferably for the purpose of producing the most economical fluid it is preferred that the R radical be methyl. As shown in the compound of formula (1), it is preferred that there be 2 to 2000 silicon atoms in the polymer chain and in any particular fluid mixture prepared in accordance with the present invention there will be silicone polymers within the scope of formula (1) wherein the polymer chain will generally average from 4 to 40 silicon atoms. The process by which the fluid of formula (1) can be produced are known to those skilled in the art. In the most preferred process for producing the fluids of formula (1) there is used a hydrolysis procedure. Thus, to obtain the fluids of formula (1), there is preferably hydrolyzed a mixture of organohalosilanes containing 60 to 96 mole percent of organohalosilanes of the formula $R_2SiX_2$ and 4 to 40 mole percent of organohalosilanes of the formula $R_3SiX$ where R is as previously defined and X is selected from halogen. This mixture of organohalosilanes is used since it will result in the average molecules of the final silicone fluid liquid having the desired amount of silicone atoms in the silicone chain. This mixture of organohalosilanes is hydrolyzed by adding it to water.

In the preferred process there is preferably used per part of the mixture or organohalosilanes 3 to 6 parts of water such that there is excess water present in addition to the amount required to carry out the hydrolysis. In such a hydrolysis, the mixture of organohalosilanes is added to the water. It should be pointed out that in the above organohalosilane mixture there may be minor amounts of trifunctional and tetrafunctional halogen silanes. However, these halogen silanes are undesired since their presence detracts from the formation of linear silicone fluid. These trifunctional and tetrafunctional silanes are present only in trace amounts.

Although the hydrolysis reaction can be carried out at room temperature it is preferred to carry it out at temperature range of 40° to 70° C, since the hydrolysis reaction proceeds at a desirable rate at that temperature range without unduly boiling off large amounts of low boiling organohalosilanes. In addition, in the hydrolysis reaction it is desired that no solvent be used such as the common inert or organic solvents since the presence of such solvents results in the formation of cyclics which is undesirable in the present hydrolysis procedure.

After the addition of the organohalosilanes to the water which usually takes place in the time of 2 to 4 hours and during such addition period there is constant agitation. Then the agitation is terminated and a water layer separates from the silicone polymer layer. The water is drained off and then there is added an amount of water equal to the volume of the silicone fluid layer and the two layers are mixed for a period of time, say, 5 to 10 minutes, whereupon after the mixing the layers are allowed to separate and the water layer is decanted. This washing procedure is carried out preferably for two or three times to remove as much as possible of the hydrogen chloride by-product that is formed during the hydrolysis reaction. It is true that most of the hydrogen chloride is given off as a gas during the hydrolysis procedure. Nevertheless, there is a certain amount of it that is entrapped in the silicone fluid layer and it is desirable to wash the silicone fluid with water so as to remove as much as possible of the hydrogen chloride impurity, and particularly it is desirable that in the final silicone fluid polymer there be less than 10 parts per million of hydrogen chloride or any strong acid for that matter. The presence of such acids degrade the polymer chain especially at elevated temperatures to neutralize any traces amount of acid that might be left in the silicone fluid layer after the washing procedure, there is preferably added to such layer small amounts of any common base such as, sodium hydroxide, potassium hydroxide or sodium bicarbonate. A weak base such as, sodium bicarbonate is preferred. After the addition of the sodium bicarbonate with agitation, the silicone fluid layer is filtered through common clay or diatomaceous earth filter to remove out the solid particles in the salts in the silicone fluid layer. Although, the resulting silicone fluid that is present after the filtration process can be used as a hydraulic/brake fluid in accordance with the present invention, nevertheless it is desired to equilibrate such fluid so as to average the polymer chain in the silicone fluid so that most of the molecules in the silicone fluid would have a polymer chain of 2 to 2000 silicon atoms. Accordingly, such silicone fluid is equilibrated by adding to it a common equilibration catalyst which may be an acid such as, toluene sulfonic acid or a strong base such as, potassium hydroxide or sodium hydroxide. Preferably, there is added to the fluid 70 to 100 parts per million of such a catalyst for the equilibration procedure.

The most desired catalyst is acid-treated and particularly sulfuric acid treated clay such as filtrol. The silicone fluid with the proper amount of filtrol therein is then heated at an elevated temperature at a temperature such as, 170° to 200° C for a period of 2 to 4 hours so to equilibrate the fluid. At the end of that time, the fluid is cooled to room temperature and if a catalyst such as, acid-treated clay, that is, Filtrol manufactured by Filtrol Corp. which is an acid-treated clay and was used in the equilibration procedure then such a catalyst can be filtered out. In the event that another type of liquid catalyst is used or a catalyst that dissolves in the fluid polymer is used then it is necessary to neutralize such a catalyst with the appropriate amount of acid or base as the case may be. The neutralized fluid is once again filtered through a clay filter is once again filtered through a clay filter or diatomaceous earth filter to remove out impurities and particularly the salts that are present in the fluid polymer.

It is preferred in the final liquid polymer that there be less than 10 parts per million of such salts since the presence of such salts will degrade the polymer chain of the silicone fluid at elevated temperatures. After the equilibrated silicone fluid has been neutralized and filtered then it is heated at an elevated temperature that is, a temperature in excess at 200° C and as high as 280° to 300° C to strip out most of the cyclics. This heating procedure is carried out for ½ to 2 hours. The cyclics present and particularly the cyclics that were formed during the equilibration procedure are undesirable in the final silicone fluid polymer since the presence of such cyclics decrease the boiling point of the silicone fluid. Thus, after the stripping off of the cyclics and low boiling point material in the fluid there results a silicone fluid having silicon polymer molecules therein which may have from 2 to 200 silicon atoms in the polymer chain. As a result of the above preferred process, most of the polymer chains have an average of 4 to 150 silicon atoms. As a results, the silicone fluid will have a viscosity at 25° C of 20 to 500 centistokes and more preferably of 20 to 150 centistokes. This silicone fluid may be used by itself as a hydraulic fluid and more preferably a brake fluid.

Although the above process is preferred in the formation of the linear silicone fluid of the present invention and particularly of the linear silicone fluid of the present invention within the scope of formula (1), and such that the average number of polymer chains as indicated above, nevertheless, there are alternative processes by which such a silicone fluid may be formed and particularly a silicone fluid of high polymer chain length.

It can be appreciated that the higher the polymer chain length of the average number of silicone molecules in the silicone fluid composition that the higher the resulting viscosity of the fluid will be. Accordingly, it is desired to maintain the chain length in the average polymer chain in the silicone fluid within the above indicated range so as to obtain the desired low viscosity of the fluid and particularly the desired low viscosity of the fluid at temperatures as low as −40° C.

Another method by which the fluid can be formed is to hydrolyze the organohalosilanes as indicated above and then place the hydrolyzate after it has been washed free of hydrogen chloride in a reaction chamber and add to it a depolymerization catalyst such as a strong base, which depolymerization catalyst may be a strong base such as potassium hydroxide or sodium hydroxide and preferably there is added 5 to 15 parts per million of such a base. The resulting mixture is then heated to a room temperature above 150° C to produce and recover by evaporation a product consisting of low molecular weight cyclic polysiloxanes comprising mostly cyclicorganotetra siloxanes and a smaller amount of cyclic trisiloxanes comprising about 85% of the tetrasiloxanes and 15% of the mixed trisiloxanes and pentasiloxanes.

It should be noted that these cyclic siloxanes that are recovered are essentially low molecular weight cyclic polymers free of any significant amount of monofunctional and trifunctional groups. The cyclic siloxanes so collected are considerably dry and free of water as such that they may have less than 100 parts per million of water. Using such a procedure, dimethylcyclic siloxanes may be prepared, methylvinylcyclioxanes may be prepared and other types of cyclicsiloxanes may also be prepared using the above procedure. The cyclicsiloxanes are then mixed in the desired presence of the different organic groups in the final linear silicone fluid. To such a mixture of cyclicsiloxanes there is preferably added a base catalyst such as, potassium hydroxide, sodium hydroxide or a strong acid catalyst such as, toluene sulfonic acid or filtrol and etc. Preferably, since it is desired to maintain the chain length of the resulting fluid polymer to a small number of silicone atoms, there is desirably used an acid catalyst since the base catalysts are more preferably used in equilibration procedures where long chain polymers are to be formed, that is, polymer chains in which there are over 10,000 silicon atoms in the silicone chain.

There is then added to the mixture of cyclicsiloxanes the proper amount of monofunctional compounds which are added to function as end-blockers so as to regulate the chain length of the polymers. The functional compounds that may be employed satisfactorily for controlling polymer growth include among others, hexamethyldisiloxane, tetramethyldiethoxydisiloxane, dimethyltetraethyldisiloxane, and divinyltetramethyldisiloxane. The equilibration reaction is carried out for a period of from 2 to 4 hours until about 85% of the cyclicdiorganosiloxanes have been converted to linear polymers end-stopped with monofunctional groups. When 85% conversion point has been reached there are just as many polymers being converted to cyclicsiloxanes as there are cyclicsiloxanes being converted to polymers. At that time, the equilibration mixture is cooled and there is added to the mixture a sufficient amount of a base such as, potassium hydroxide or sodium bicarbonate so as to neutralize the acid catalyst and to terminate the polymerization. The cyclicdiorganosiloxanes in the reaction mixture are then distilled off to leave the diorganopolysiloxanes which are useful in the present invention. The resulting salts that are present in the linear polydiorganosiloxane may also be filtered off by filtering the polysiloxane through common clay or a diatomaceous earth filter. Thus, either of the above two procedures may be used to produce the linear silicone fluid of formula 1 which is the base hydraulic fluid of the present case.

For various reasons, when the silicone fluid of formula (1) is to be used as hydraulic fluid and particularly a brake fluid, it may be necessary to add various additives to such a linear silicone fluid of formula 1 for the purpose of enhancing its properties as a brake fluid. Thus, there may be added to the linear silicone fluid of formula 1, generally 1 to 40% by weight of the total fluid, and more preferably 1 to 20% by weight of the total fluid of a pour depressant additive which is a branched chain low viscosity silicone fluid containing 80 to 91 mole percent of $R_2^{20}SiO$ units, 5 to 10 mole percent of $R_3^{20}SiO$ units, and 4 to 10 mole percent of $R^{20}SiO_{3/2}$ units, wherein $R^{20}$ has the same definition as the R radical and wherein $R^{20}$ is more preferably a lower alkyl radical of 1 to 8 carbon atoms and most preferably, methyl or ethyl. The preferred branched chain low viscosity silicone fluid has a viscosity from 5 to 100 centistokes at 25° C. Such a branched chain silicone fluid may be added to the silicone fluid polymer of formula 1 within the broad range indicated above since it is completely miscible with the linear silicone fluid of formula (1), that is, the two silicone fluids can be mixed in any desired quantity together and there will result a single, clear phase containing both silicone fluids. Such a branched chain silicone fluid, as defined above, is added basically for the purpose of maintaining a desirable viscosity in the resulting mixture such that, even at excessively low temperatures such as, −58° C, the resulting silicone fluid mixture will have an advantageously low viscosity, such as, less than 1000 centistokes.

However, in the more preferred case, there is added 1 to 20% by weight of the branched chain silicone fluid based on the weight of the total fluid. Such a quantity of the branched chain silicone fluid in combination with the linear silicone fluid of formula 1 will sufficiently control the viscosity of the resulting silicone fluid mixture such that it has an advantageously low viscosity at temperatures even as low as −58° C. This branched chain low viscosity silicone fluid is to be distinguished from the linear silicone fluid of formula 1 in that in its polymer chain there is a presence of a substantial amount of the $R^{20}SiO_{3/2}$ trifunctional units, resulting in a branched chain silicone polymer rather than a linear polymer within the scope of formula (1).

In addition, it is preferred that this branch chained fluid be used in combination with the linear silicone fluid of formula (1), rather than be used in place of the linear silicone fluid of formula 1, in that such a branch chained fluid as that determined above does not have the high temperature stability nor is it as economical to produce as the linear silicone fluid of formula (1). Such a branch chained low viscosity fluid is generally prepared by a hydrolysis procedure much the same as that discussed in connection with the preparation of the linear silicone fluid of formula (1).

Thus, in order to carry out the hydrolysis there is preferably utilized a mixture containing 80 to 90 mole percent of $R_2^{20}SiX_2$, 5 to 10 mole percent of $R_3^{20}SiX$ and 4 to 10 mole percent of $R^{20}SiX_3$, where X is halogen and preferably chlorine and $R^{20}$ is as previously defined. It is necessary to use the above mole percent of the different molecules or organohalosilanes in order to obtain a silicone fluid in which there is the desired amount of silicon atoms. Thus, that the resulting silicone fluid formed by the process has the desired viscosity, that is, a viscosity of preferably 25 to 50 centistokes at 25° C.

In the hydrolysis procedure as previously defined, one part of the mixtures of organohalosilanes is added to 3 to 6 parts of water. In this hydrolysis procedure it is again preferred to use an excess amount of water so as to hydrolyze all the halogens present in the different organohalosilanes so that the necessary siloxane bonds will be formed to produce a siloxane polymer. Although the reaction can be carried out at room temperature, it is preferable to react the organohalosilanes with the water at a temperature of 40° to 70° C so as to carry out the reaction as efficiently as possible. Preferably, the addition of the organohalosilanes to the water is carried out in a period of ½ hour to 2 hours with the proper agitation. A solvent is not desirable in this hydrolysis reaction and particularly a common inert organic solvent such as, xylene or toluene, is not preferred in the present process since the presence of such solvents results in the formation of undesirable cyclics.

After the addition period of the organohalosilanes to the water is completed in a time period which may take as much as 4 hours, then the mixture is allowed to stand whereupon there forms a silicone polymer layer and a water layer. The water is decanted off or drained off and there is added to the silicone polymer layer an equal volume or more of water which additional water is agitated with the silicone polymer layer so as to dissolve as much as possible of the hydrogen chloride that may be dissolved in the silicone polymer layer. The wash water is then drained off and the washing procedure is again repeated with additional water. Although most of the hydrogen chloride that is formed during the hydrolysis reaction is given off as a gas, a portion of this by-product is entrapped in the silicone polymer layer. Thus, the washings with water are needed to remove as much as possible of this entrapped hydrogen chloride. It is undesirable to have more than 10 parts per million of hydrogen chloride in the final silicone polymer, since the presence of such hydrogen chloride degrades the branch chained silicone fluid and particularly such degradation results when the branch chained silicone fluid is exposed to elevated temperatures.

After the washing is completed, then there is added to the branch chained silicone fluid layer small amounts of any common base so as to neutralize any additional hydrogen chloride that may still be left in the silicone fluid layer. Such a base may be sodium hydroxide, potassium hydroxide or a weak base such as, sodium bicarbonate which is preferred. After the addition of the base, the salts that are formed are removed from the silicone fluid by filtering the silicone fluid through a common clay or diatomaceous earth filter. At this point, the silicone fluid may be used as is in the present invention, that is, as a pour depressant, additive to the basic linear silicone fluid of formula (1), which is the basic hydraulic fluid of the present invention. Preferably, the branch chained silicone fluid is equilibrated in the presence of 5 to 15 parts per million of a strong base or a strong acid at a temperature in the range of 170° to 200° C so as to produce a large number of polymer molecules having a certain average number of silicon atoms. Thus, preferably there is added to the branch chained silicone fluid 5 to 15 parts per million of an acid-treated clay such as, acid-treated Fuller's Earth as the catalyst and the resulting mixture is heated to the temperature range indicated above for a period of 2 to 4 hours. At the end of that time, if the catalyst that was used was Fuller's Earth such as catalyst may be filtered out.

In the event that there was used another type of catalyst such as, potassium hydroxide, sodium hydroxide, toluene sulfonic acid or other type of a strong base or strong acid, then the catalyst in the equilibrated silicone fluid is neutralized with a base or acid as the case may be.

After the neutralization procedure, the branch chained silicone fluid is cooled to room temperature and the salt impurities that are in the fluid are filtered out by filtering the fluid through a common clay or diatomaceous earth filter. Then the fluid is taken and heated to a temperature above 200° C and more preferably at a temperature at 280° C or above to strip out most of the cyclics that were formed during the hydrolyzation procedure and particularly during the equilibration procedure. The cyclics are undesired in the final product since as stated before the presence of such cyclics lower the boiling point of the silicone fluid. After the stripping procedure which is carried out for a period of 1 to 4 hours, the fluid is cooled to room temperature and is ready to be added to the linear silicone fluid of formula (1) as a pour depressant additive. Generally, such a branch chained silicone fluid has a viscosity of 5 to 100 centistokes at 25° C and there may be in any polymer molecule in such a fluid from 10 to 1000 silicon atoms in the polymer chain.

The linear silicone fluid of formula (1), alone or in combination with the branch chained low viscosity silicone fluid provides an exceptional hydraulic fluid, particularly in view of the fact that it has very little if any hygroscopicity. However, for certain uses of such a silicone fluid, alone or in combination with the pour depressant silicone fluid, as a hydraulic fluid and particularly a hydraulic fluid for a brake system, it is necessary that such a fluid have a certain water tolerance, that is, if water becomes accidentally mixed with the silicone fluid that such water will be absorbed in the fluid and not separate out to form ice crystals at low temperatures or a vapor at elevated temperatures. To measurably increase the water tolerance of the linear silicone fluid of formula (1), it is desirable to add to it a water tolerance additive which is selected from certain preferred water tolerance additives that is compatible with a linear silicone fluid of formula (1), alone or in combination with a branch chained silicone fluid. Thus, generally there may be added to the silicone fluid of formula (1), wherein there is present in combination with 60 to 95% by weight of the linear silicone fluid, a water tolerance additive which is present at a concentration of 5 to 40% by weight of the total fluid, which water tolerance additive should preferably be selected from the class consisting of glycols, glycol polyethers, aliphatic alcohols, silane esters, boron esters, carboxylic acids, anhydrides and polysiloxane copolymers having therein ester or amine functionality.

The above are the desirable water tolerance additives that may be added to the linear silicone fluid of formula (1), either alone or in combination with the pour depressant silicone fluid. There are two requirements which the water tolerance additive has to meet — first, it has to be able to absorb a certain amount of water, say, anywhere from 0.1 to 5% of water depending on the concentration at which it is mixed with the linear silicone fluid and second of all, it has to be compatible with the linear silicone fluid. It can be understood that concentration at which some of the above additives can be used will vary. Thus, the concentrations at which they will be used in combination with the linear silicone fluid will vary but be within the broad general ranges indicated above. Thus, although all of the above water tolerance additives have a water compatibility of generally from 0.1 to 5% by weight of water or more depending on the concentration that they are used with with the linear polysiloxanes of formula (1), such water tolerance additives are compatible either to the extent of being totally miscible or to the extent of forming an emulsion with a linear silicone fluid of formula (1) at the various concentrations which are indicated in the above broad concentration range indicated above. Thus, while the polysiloxane copolymers having therein ester or amine functionality which will be more specifically defined below may be added at concentrations as high as 60% of the polysiloxane copolymer in combination with 40% by weight of the linear silicone fluid and still be compatible, other water tolerance additives such as the glycols and the glycol polyethers have a more limited compatibility with the linear silicone fluid of formula (1). Accordingly, it is preferred to have a concentration of the water tolerance additives at the upper limit of 40% by weight of the total fluid such that broadly the concentration of the water additives may vary from 5 to 40% by weight of the total fluid. Accordingly, the water tolerance additives are more preferably used at a concentration of 5 to 20% by weight based on the total fluid in combination with 80 to 95% by weight of the linear silicone fluid of formula (1) and more preferably at a concentration of 10 to 20% by weight of the total fluid. Although the water tolerance additives may be used at a concentration as low as 1% by weight of the total hydraulic fluid, it is highly desirable that they be present at a concentration of 5% or 10% by weight or more to have the most desirable water compatibility effect on the linear polysiloxane of formula (1).

The glycol additives that should be used have generally the formula,

$$HO-R^1-OH$$

wherein $R^1$ is selected from the class consisting of alkylene and arylene radicals of 2 to 12 carbon atoms such as hexylene, phenylene and naphthylene. More preferably, $R^1$ is hexylene.

Another water tolerance additive that should be used above is the carboxylic acid anhydrides selected from the class consisting of compounds of the formula,

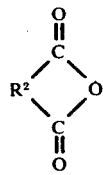

and of the formula,

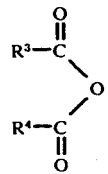

where $R^2$ is selected from the class consisting of alkylene and arylene radicals of 4 to 15 carbon atoms and is preferably, phenylene, or from a hydrocarbon-stopped substituted alkylene and arylene radicals of 4 to 15 carbon atoms, $R^3$ and $R^4$ are preferably selected from the class consisting of monovalent hydrocarbon radicals and halogenated monovalent hydrocarbon radicals and are preferably alkyl radicals of 1 to 12 carbon atoms or substituted aryl radicals of 6 to 12 carbon atoms. In addition, it can be stated that the $R^3$ and $R^4$ radicals may be substituted alkyl radicals such as halogen-substituted alkyl radicals of 1 to 12 carbon atoms.

Some examples of suitable anhydrides of carboxylic acid include acetic anhydride, pyrollytic dianhydride, benzoic anhydride, maleaic anhydride, ambutyric anhydric, chloro maleaic anhydride, citraconic anhydride, cyclobutane carboxylic acid anhydride, 1,2-cyclohexane dicarboxylic acid anhydride, 4-cyclohexane-1,2-dicarboxylic anhydride, 1,2,3,4-cyclopentanetetracarboxylicdianhydride and n-decyl succinic anhydride, n-decyl succinic anhydride, 2,3-dimethyl maleaic anhydride, hydrochloric anhydride, maleaic anhydride, methylsuccinic anhydride, 1,8-nathalic anhydride, propionic anhydride, tetrachloromethallic anhydride, 3,4,5,6-tetrahydromethallic anhydride, stearic anhydride and the mixed anhydrides of acetic and benozic acids. The preferred anhydrides are benzoic anhydride, stearic anhydride, succinic and n-decylsuccinic anhydride.

Another water tolerance additive that should be used is a silane ester of the formula $R_z{}^5Si(OR^6)_{4-z}$ and a boron ester having the formula $R_z{}^5B(OR^6)_{4-z}$ as well as partially hydrolyzed products of the foregoing esters. In the above formulas, $R^5$ and $R^6$ are selected from the class consisting of monovalent hydrocarbon radicals and halogenated monovalent hydrocarbon radicals and $z$ is a whole number that varies from 0 to 3 and is preferably 1, $R^5$ is preferably selected from alkyl radicals of alkyl or alkenyl radicals of 1 to 10 carbon atoms and more preferably from alkyl radicals from 1 to 5 carbon atoms, such as, methyl, ethyl, etc. The radical $R^6$ is also preferably selected from alkylalkenyl radicals of 1 or 2 as the case may be up to 10 carbon atoms. Preferably, $R^6$ is methyl or ethyl. The above silane esters are well known in the art and the boron esters have also been prepared and are known in the art. More information as to these esters can be, for instance, found in the pending application of Warren R. Lampe, Ser. No. 76,265, filed Sept. 28, 1970, and now U.S. Pat. No. 3,696,090, entitled "Room Temperature Vulcanizable Silicone Rubber Composition". The above silane esters are more preferred in the present invention since they are more well known and are more readily available.

In addition to the above silane or boron esters, the partially hydrolyzed products of these esters can also be used as a water tolerance additive within the concentrations indicated above.

The most preferred water tolerance additives are the polysiloxane copolymers since they have the greatest amount of compatibility with the linear silicone fluid of formula (1). A polysiloxane copolymer having amine functionality which can be used as a water tolerance additive in the above concentrations is a compound of the average unit formula,

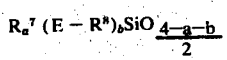

where $R^7$ is selected from the class consisting of monovalent hydrocarbon radicals and halogenated monovalent hydrocarbon radicals and is preferably a lower alkyl radical or a lower alkenyl radical of 1 or 2 to 8 carbon atoms. $R^7$ may also be selected from arylene radicals. It is important to note in the same copolymer the $R^7$ radical may represent both lower alkyl, alkenyl and aryl radicals such as, phenyl. The $R^8$ radical is a divalent hydrocarbon radical selected from the class consisting of alkylene and arylene radicals and preferably alkylene and arylene radicals of up to 20 carbon atoms such as, methylene, propylene, and is most preferably an alkylene radical such as ethylene, propylene, butylene and etc. The moiety E is selected from the class consisting of —NH$_2$,

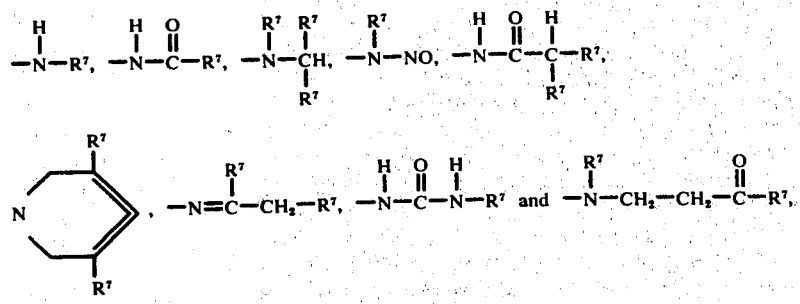

where the $R^7$ radicals in the E symbol moieties may be the same or different from the $R^7$ radicals attached to the silicon atoms. In the above formula, $a$ varies from 1.11 to 2.02, $b$ varies from 0.023 to 1.00 and the sum of $a + b$ varies from 2.0 to 3.00. It must be pointed out that the process for forming such a polysiloxane copolymer comprises reacting an olefinic cyanide with a hydrogen polysiloxane in the presence of an SiH olefin addition catalyst and then reacting the resulting polysiloxane product with hydrogen in the presence of a nickel catalyst to form the corresponding primary amine group on the polysiloxane which primary amine group can then be reacted with other groups to add those groups on to the amine moiety. For more precise description of the process by which such polysiloxane copolymers as defined above are produced, one is referred to the description and discussion in the application of Frank J. Traver, entitled "Polysiloxane Compositions Useful as Brake Fluid", Ser. No. 132,556, filed Apr. 8, 1971, now U.S. Pat. No. 3,725,287.

A polysiloxane copolymer which is more preferably used as a water tolerance additive for the linear silicone fluid of formula (1), comprises a polysiloxane copolymer of the formula,

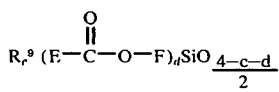

where $R^9$ is selected from the class consisting of monovalent hydrocarbon radicals and halogenated monovalent hydrocarbon radicals and is preferably selected from alkyl of 1 to 8 carbon atoms, alkenyl radicals of 2 to 8 carbon atoms and mononuclear aryl radicals. In the same silicone polysiloxane molecule the $R^9$ radical can represent a combination of lower alkyl, lower alkenyl and mononuclear aryl radicals connected to various silicone atoms as well as other types of radicals. More preferably, the $R^9$ radical represents lower alkyl radicals such as, methyl, ethyl, and etc. The radical F is selected from the class consisting of alkylene and arylene radicals of up to 20 carbon atoms and can also represent hydrocarbon substituted alkylene and arylene radicals of up to 20 carbon atoms. The moiety E in the above formula represents various radicals which are selected from the class consisting of $R^9-$, $R^9$ O $R^{10}-$,

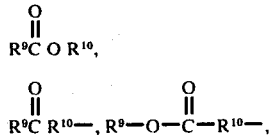

$R^9-(O\ C_xH_{2x})_y-O-R^{10}-$, and $-R^{10}-OH$, where the $R^9$ radicals in the E moieties is as previously defined and can be the same or different from the $R^9$ radical attached to the silicon atoms. In the polyether moieties that may be represented by the symbol E, x is a whole number that varies from 2 to 4, y is a whole number that varies from 1 to 4 and in the average unit formula of the ester polysiloxane, c varies from 1.1 to 2.202, d varies from 0.023 to 1.00, and the sum of c + d varies from 2.024 to 3.00. For more information as to this ester polysiloxane, the skilled worker in the art is referred to the disclosure of the patent application of Frank J. Traver, entitled "Silicone Acetate Brake Fluid", having Ser. No. 125,397, filed Mar. 17, 1971. The disclosure of this patent application as well as the disclosure of the previous patent application disclosing the preparation and the composition of the amine functional polysiloxane copolymers is incorporated into the present application by reference.

The process for forming such an ester polysiloxane copolymer generally comprises reacting an alkenoic alcohol with an acid in the presence of a strong acid and then taking the resulting olefinic ester and reacting that product with a hydrogen polysiloxane in the presence of a platinum catalyst as is more fully disclosed in the above referred to patent application. For further information as to the composition as well as to the process by which the amine functional polysiloxane copolymer and the ester functional polysiloxane copolymer identified above are prepared, one is referred to the above discussed patent application which disclosure is hereby incorporated into the present application by reference.

Another preferred polysiloxane copolymer which is compatible with the linear silicone fluid of formula (1), either alone or in combination with the branch chained silicone fluid, comprises a polysiloxane of the formula,

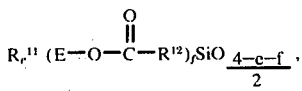

This polysiloxane copolymer is the reverse ester of the polysiloxane copolymer identified previously. Such an ester polysiloxane copolymer as identified by the above formula is a preferred water tolerance additive within the scope of the present invention. In this formula, $R^{11}$ is selected from the class consisting of monovalent hydrocarbon radicals and halogenated monovalent hydrocarbon radicals and is more preferably selected from lower alkyl radicals of 1 to 8 carbon atoms, lower alkenyl radicals of 2 to 8 carbon atoms and mononuclear aryl radicals, such radicals being more preferably methyl, ethyl, vinyl, and allyl and phenyl. More preferably, the $R^{11}$ radical is selected from lower alkyl radicals such as, methyl, ethyl. The $R^{12}$ radical in the above formula is a divalent hydrocarbon radical such as, alkylene or arylene radicals of 20 carbon atoms or less. Preferably, it is selected from alkylene and arylene radicals of 20 carbon atoms and less, and is preferably a lower alkylene radical such as, ethylene, propylene, butylene, etc. In the above reverse ester polysiloxane copolymer, the symbol E is preferably selected from the class consisting of, $R^{11}-$, $R^{11}OR^{12}-$,

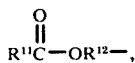

$R^{11}(OC_xH_{2x})_y-O-$, $R^{12}OH$ and $-R^s(OH)$, where $R^s$ is a polyvalent hydrocarbon radical having an s number of hydroxyl groups where s varies from 2 to 5, x is a whole number that varies from 2 to 4, and y is a whole number that varies from 1 to 4. In the moieties, the $R^{11}$ radical and the $R^{12}$ radical may be the same or different from the $R^{11}$ and $R^{12}$ radicals attached to the silicon atoms in the same polysiloxane molecule. In the above reverse ester formula, e varies from 1.11 to 2.02, f varies from 0.023 to 1.00 and the sum of e + f varies from 2.024 to 3.00.

In addition to the above water tolerance additives, there could be used as a water tolerance additive glycol based polyethers that are presently sold commercially as brake fluids. Thus, a certain amount of these glycol based polyethers may be added to the linear silicone fluid of formula (1), either alone or in combination with the branch chained silicone fluid, so as to result in a hydraulic fluid mixture in which the hydraulic fluid mixture is compatible with a reasonable amount of water that may accidentally be added to the hydraulic fluid mixture when it is used in a hydraulic system such as the hydraulic brake system of an automobile. Such a glycol based polyether generally has the formula, $$R^{13}(O\ C_rH_{2r})_w\text{—}O\text{—}R1\text{ — }M$$

where $R^{13}$ is selected from lower alkyl radicals of 1 to 8 carbon atoms and is preferably propyl or butyl, R' is selected from the class consisting of alkylene and arylene radicals of 2 to 12 carbon atoms and is preferably propylene, M is selected from the class consisting of —OH and $R^{13}$ (O $C_vH_{2v}$)$_w$—O—, where in the above formula of the M group $v$ is a whole number that varies from 2 to 4 and $w$ is a whole number that varies from 2 to 10. Thus, glycol based polyethers within the scope of the above formula which are sold commercially as brake fluids or which can be easily obtained may be added as water tolerance additives to the linear silicone fluid of formula (1), alone or in combination with the branch chained silicone fluid to produce a hydraulic fluid having some water tolerance and still having the superior properties that are associated with the linear silicone fluid of formula (1), alone or in combination with the branch chained silicone fluid. The polysiloxane reverse ester copolymers discussed above are generally prepared by reacting an alkenoic acid with an alcohol in the presence of a strong acid and then reacting the resulting product with a hydrogen polysiloxane in the presence of platinum catalyst as is more fully explained in the patent application of Frank J. Traver, entitled "Polysiloxane Composition Useful as a Brake Fluid," which is U.S. Pat. No. 3,859,321, issued Jan. 7, 1975. For a more fuller definition of the composition of the reverse ester polysiloxane brake fluid defined above as well as the more fuller explanation of the process by which it is obtained, one is referred to the above cited patent of Frank J. Traver which is hereby incorporated into the present application by reference.

It can be appreciated that other types of water tolerance additives may be used or incorporated into the linear silicone fluid of formula (1), alone or in combination with the branch chained silicone fluid, so as to impart to the resulting hydraulic mixture a desirable water tolerance.

The water tolerance additives indicated above and particularly the copolymer polysiloxanes having amine or ester functionality have the added advantage that they act as rubber swell additives, that is, the linear silicone fluid of formula (1), does not swell most rubbers by desired amount. Thus, in the hydraulic brake systems of automobiles it is desirable that the brake fluid swell the rubber and the rubber parts that are part of that hydraulic brake system by 0.1 to 2%, so that by such swelling of the rubber parts more efficient seals will be formed by such rubber parts. It has been found that in some cases the linear silicone fluid of formula (1) does not have the desired swelling effect on various types of rubbers that are used in hydraulic brake systems of automobiles. Accordingly, it may be desired to add a rubber swell additive to the hydraulic fluid mixture. It should be pointed out that in the case where the polysiloxane copolymers identified above which polysiloxane copolymers have ester or amine functionality, that such polysiloxanes will swell the rubber parts in the hydraulic brake system sufficiently so that proper seals are formed. This is true when such polysiloxanes are present at a concentration of 5% by weight or more in the hydraulic fluid mixture. It should be pointed out that the glycol based polyethers also act both as water tolerance additives and as rubber swell additives. This is true of many of the water tolerance additives discussed above. In addition to the above water tolerance additives or in the case when such water tolerance additives are not used in combination with the linear silicone fluid of formula 1, then there may be needed to add certain specific types of rubber swell additives.

Thus, based on the weight of the total hydraulic fluid mixture there is preferably added 1 to 5% by weight of rubber swell additives selected from the class consisting of organic solvents, esters of the formula, $$R^{22}O\text{—}\overset{\overset{\displaystyle O}{\|}}{C}\text{—}R^{23}\text{—}\overset{\overset{\displaystyle O}{\|}}{C}\text{—}OR^{24},$$

and esters of the formula, $$R^{25}\overset{\overset{\displaystyle O}{\|}}{C}\text{—}OR^{26}$$

wherein $R^{22}$ and $R^{24}$ are selected from the class consisting of monovalent hydrocarbon radicals and halogenated monovalent hydrocarbon radicals of 4 to 15 carbon atoms and are preferably alkyl radicals of 4 to 15 carbon atoms and $R^{25}$ and $R^{26}$ are defined as $R^{22}$, and $R^{24}$ and $R^{23}$ is selected from divalent hydrocarbon radicals and halogenated divalent hydrocarbon radicals of 5 to 12 carbon atoms. Preferably, $R^{23}$ is an alkylene radical of 5 to 12 carbon atoms.

The preferred inert organic solvent which may be used as rubber swell additives are such inert organic solvents such as, mineral spirits, xylene, toluene and low molecular weight hydrocarbon fractions. However, such solvents are not generally preferred and the esters indicated above are the more preferred rubber swell additives. Within the scope of the rubber swell additives indicated above the most preferred are dioctyl azelate, dioctyl adipate and dioctyl sebacate. Thus, it is preferred that these rubber swell additives be added at a concentration of 1 to 5% by weight of the total hydraulic fluid mixture so as to impart the proper rubber swell properties to the hydraulic fluid mixture.

It may also be desirable to add to the linear silicone fluid of formula (1), either alone or in combination with the branch chained silicone fluid, at a concentration of 0.05 to 2% by weight of the total hydraulic fluid of an anti-corrosion additive selected from the class consisting of the zinc salts of naphthenic acid and a compound of the formula,

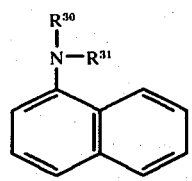

wherein $R^{31}$ is selected from the class consisting of hydrogen and lower alkyl radicals of 1 to 8 carbon atoms and $R^{30}$ is selected from the class consisting of aryl radicals, alkylaryl radicals and halogenated aryl radicals and is preferably phenyl. More specific anti-corrosion additives are such compounds as phenylnaphthylamine and nonylphenylacetic acid and such proprietary products as duPont's formulation RP-2 and Ortholium manufactured by E. I. duPont deNemours & Co.

In addition, there may be used at a concentration of 1 to 5% by weight of the total hydraulic fluid mixture of an antioxidant compound selected from the class consisting of

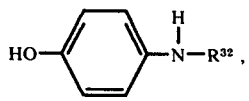

and

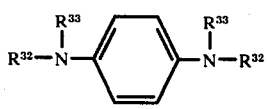

where $R^{33}$ is selected from the class consisting of hydrogen, monovalent hydrocarbon radicals and halogenated monovalent hydrocarbon radicals and is more preferably selected from hydrogen and lower alkyl radicals of 1 to 8 carbon atoms, $R^{32}$ is selected from the class consisting of monovalent hydrocarbon radicals and halogenated monovalent hydrocarbon radicals and is more preferably a lower alkyl radical of 1 to 8 carbon atoms, wherein in the above formulas of the phenyl anti-oxidant compounds it is most preferred that $R^{33}$ be hydrogen or methyl and $R^{32}$ be methyl. In addition, there may be used as an anti-corrosion additive at a concentration of 0.01 to 2% by weight of the total hydraulic fluid a hydrogen polysiloxane of the formula,

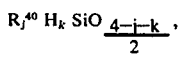

wherein the above formula $R^{40}$ is selected from lower alkyl radicals having 1 to 8 carbon atoms, $j$ is a number that varies from 1.11 to 2.02, $k$ is a number that varies from 0.023 to 1.00, and the sum of $j + k$ varies from 2.024 to 3.00. Thus, as indicated above, there may be added to the linear siliconefluid of formula 1, either alone or in combination with the branch chained silicone fluid, various types of rubber swell additives, anti-corrosion additives and anti-oxidant additives either alone or in combination with each other, so as to enhance the resulting properties of the hydraulic silicone fluid when it is used in the hydraulic system and particularly in a brake hydraulic system of an automobile. It can be appreciated that there are many other types of anti-oxidant additives and rubber swell additives that may be added to the linear silicone fluid of formula (1) either alone or in combination with the branch chained silicone fluid so as to enhance the properties of the resulting hydraulic silicone fluid mixture, with compounds that have been mentioned above are only the most preferred compounds. Only the most preferred additives have been indicated above so as to not unduly burden the present application with information that is unnecessary to a skilled worker in the art. As with the water tolerance additives suffice to say, any known rubber swell additive and any known anti-oxidant additives may be added to the linear silicone fluid of formula 1, either alone or in combination with the branch chain silicone fluid if such additives are compatible with the silicone fluids. It should be noted that the above specifically mentioned additives are compatible with the linear silicone fluid of formula (1) either alone or in combination with the branch chained silicone fluid. It can also be appreciated that the rubber swell additives and the anti-corrosion additives may be added either alone or in combination with the above discussed water tolerance additives which additives are added to the linear silicone fluid of formula (1), either alone or in combination with the branch chained silicone fluid. It can also be appreciated that there is within the scope of the present invention a hydraulic silicone fluid mixture which comprises the linear silicone fluid of formula 1 either alone or in combination with the branch chained silicone fluid to which silicone fluid mixture there may be added any of the water tolerance additives either alone or in a combination with the anti-oxidant additive, anti-corrosion additives and rubber swell additives, which additives again may be added alone or in combination with each other. Thus, in the particular hydraulic fluid mixture within the present invention there may be used in addition to the linear silicone fluid of formula (1), any combination of the above ingredients. Thus, it may be appreciated that there is within the scope of the present invention a hydraulic fluid mixture having therein the linear silicone fluid of formula (1), either alone or in combination with the branch chained silicone fluid to which may be added any of the water tolerance additives either alone or a particular combination of such water tolerance additives to which mixture there may also be added a specific antioxidant compound, a specific anti-corrosion compound or a specific rubber swell additive compound or any combination of such antioxidant compounds or rubber swell additives and anticorrosion compounds, so as to result in a hydraulic silicone fluid mixture which has particular advantageous properties for a particular hydraulic system.

There may be added to the linear silicone fluid of formula (1), other classes of additives such as, buffering agents and etc., which are also within the scope of the present invention so as to result in a hydraulic fluid that has enhanced properties in a particular area.

The examples below are presented for the purpose of illustrating the present invention and are not intended in any way or manner to limit the scope of the invention as defined in the specification and the claims.

EXAMPLE 1

There is prepared a dimethylpolysiloxane fluid by placing a 5-liter, three-necked round bottom flask equipped with mechanical stirrer, y-head thermometer, additional funnel condenser and heating mantle, 2000 parts of octamethyltetrasiloxane, 190 parts of hexamethyldisiloxane, and 65 parts of Filtrol No. 20 which is an acid-treated clay. The reaction ingredients are slowly heated to elevated temperatures for the purpose of equilibrating the ingredients. The pot temperature was slowly raised to 180° C over a 5-hour period due to the refluxing of the hexamethyldisiloxane. Once the temperature of 180° C is reached the equilibration is continued for 2 hours at 180° C and the equilibrated oil is cooled to 80° C. Then 80 grams of Celite 545 are added. The mixture is then stirred for 1/4 hour before the equilibrated mixture is filtered. Then the filtered equilibrate is stripped at 280° C and at 1 mm vacuum so as to remove most of the cyclics from the equilibrate. This stripping procedure is carried out for a period of 1 to 3 hours. At the end of that time there is obtained a dimethylpolysiloxane which is chain-stopped with trimethylsiloxy groups and which has a viscosity of 100 centistokes at 25° C. This dimethylpolysiloxane fluid is mixed with various amounts of an ester polysiloxane copolymer of the formula,

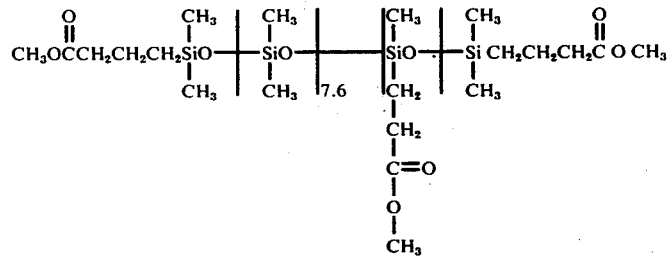

Thus, there is prepared 3 blends of the ester polysiloxane with the dimethyl fluid wherein in the first blend there is present 5% of the ester fluid and 95% of the dimethyl fluid. In the second blend there is present 10% of the ester fluid and 90% of the dimethyl fluid and in the third blend there is present 50% by weight of the ester fluid and 50% by weight of the dimethyl fluid. All fluid blends were clear and water white. Samples of all these three blends were placed in a 80% relative humidity atmosphere for 16 days. At the end of that time, all the samples were tested and it was found that the sample form blend No. 1 picked up 0.03% by weight of water; the second sample picked up 0.1% by weight of water; and the third sample picked up 0.16% by weight of water.

The flash point of the three blends were also determined wherein in such a test a cup is filled with the sample of the blend to a specified level and then the fluid temperature is first increased rapidly and then at a slower rate as the flash point is approached. At specified intervals a small test flame is passed across the cup containing the sample of the blend. The lowest temperature at which application of the test flame causes vapor above the fluid surface to ignite is the flash point. In this test the sample of blend No. 1 had a flash point greater than the 550° F; the sample from blend No. 2 had a flash point greater than 530° F; and the sample from blend No. 3 had a flash point greater than 440° F.

Then the kinematic viscosity determination is carried out to determine the measure of time necessary for a fixed volume of the hydraulic fluid mixture to flow through a calibrated glass viscometer under an accurately reproducable head and a closely controlled temperature. The kinematic viscosity is then calculated from the measure of flow time and the equilibration constant of the viscometer. At −40° F, blend No. 1 had a viscosity of 500 centistokes; blend No. 2 had a viscosity of 480 centistokes; and blend No. 3 had a viscosity of 400 centistokes. At 122° F, blend No. 1 had a viscosity of 25 centistokes; blend No. 2 had a viscosity of 20 centistokes and blend No. 3 had a viscosity of 10 -entistokes; blend No. 2 had a viscosity of 8 centistokes and blend No. 3 had a viscosity of 6 centistokes.

The dry equilibrium reflex boiling point test can also be carried on with the fluid by placing 60 mm of the brake fluid in a flask and boiling under specified equilibrium conditions in a 100 mm flask. The average temperature of the boiling fluid at the end of the reflex period is determined and corrected for variations of barometric pressure if necessary and the volume so obtained is the equilibrium reflex boiling point. Blend No. 1 had a dry equilibrium reflex boiling point greater than 700° F; and blend No. 3 had a dry equilibrium reflux boiling point greater than 650° F. The wet equilibrium reflux boiling point test is carried out by taking a 100 mm sample of the brake fluid and placing it in a 80% Relative Humidity Atmosphere under control conditions. Such a fluid is humidified, that is, the sample of the fluid of blend No. 3 is humidified along with 100 mm of SAE compatibility fluid, which humidification of the SAE compatibility is used to establish the end point of the humidification. Thus, when the SAE compatible fluid has absorbed at least 3% by weight of water the humidification procedure is terminated. At the end of that time, the hydraulic fluid mixture of blend No. 3 had absorbed 0.10% by weight of water. After the humidification, the equilibrium reflex point of the brake fluid is determined as in the dry equilibrium boiling point test. When the humidified fluid of blend No. 3 was run in the above dry equilibrium reflux boiling point it is found to have a wet equilibrium reflux boiling point of greater than 450° F.

Then there may be carried out various stability tests such as, a high temperature stability test and a chemical stability test. In the case of the high temperature stability test a 60 mm sample of the hydraulic fluid is maintained at the holding temperature for 120 +5 minutes. Then for the next 5 ±2 minutes the fluid is heated to an equilibrium reflux rate of 1 to 2 drops per second and the temperature is taken. When the fluid of blend No. 3 was used in this test, there was experienced throughout the test temperature drop of less than 1°, that is, a temperature drop of less than 1° during the equilibrium refluxing of the fluid, which is indicative of the superior high temperature stability of the hydraulic fluid mixture of blend 3.

In the chemical stability test, 30 ± 1 ml of the hydraulic fluid of blend No. 3 is mixed with 30 ± 1 ml of SAE-1 compatibility fluid in a boiling flask. First, the initial equilibrium reflux boiling point of the mixture is determined by applying heat to the flask so that the flask is refluxing at 10½ minutes at a rate in excess of 1 drop per second. Then over the next 15 ± 1 minute, the reflux rate is adjusted and maintained at 1 to 2 drops per second. This rate is maintained for an additional minute and the temperature drop in the equilibrium reflux boiling point is recorded. In the fluid blend No. 3 the reflux boiling point in the above test was negligible thus showing its superior chemical stability.

Then the fluid of blend No. 3 is tested in appearance at low temperature test which comprises taking the hydraulic fluid and lowering it to an expected minimum exposure temperature such as, −40° C, and the fluid is then observed for clarity, gellation, sedimentation, excessive viscosity and thixotropicity. The hydraulic fluid of blend No. 3 with the amount of water that it absorbed after 16 days exposure at 80% relative humidity, that is, with −0.16% by weight of water, when exposed to the temperature of −40° C was clear, there was no gellation, sedimentation, the viscosity was less than 500 centistokes and it was not thixotropic. In addition, upon reversion of the sample bottle in which the test is carried out, the time required for the air bubble to travel to the top of the fluid is less than 10 seconds. Then there may be desirable to carryout an additional water tolerance test. In this test, the hydraulic fluid of blend No. 3 is diluted with 2% by weight of water is stored at low temperatures of −40° to −50° C for 24 hours. At the end of that time, the fluid is observed and it was found to be clear without stratifications or sedimentation. The line fluid was placed in an oven at 60° C for 24 hours. At the end of that time, the fluid was again observed and it was found to be clear, without any stratification or sedimentation.

The rubber swelling properties in Styrene Butadiene rubber cups of blend No. 3 was also determined. The cups were placed in a jar and the fluid of blend No. 3 was added so as to cover the rubber cups. One jar was heated for 120 hours at 70° C and the other for 70 hours at 120° C. At the end of that time the cups were taken out, washed and examined for disintegration and measured for swelling as well as determination made of their hardness. It was determined that when Styrene Butadiene rubber cups were used in the above test with the hydraulic fluid of blend No. 3, that the rubber cups after the test had the same hardness as prior to the test and that such rubber cups had expanded or swollen by 1.1% in volume as the result of the exposure to the fluid of blend No. 3,. In addition, there was no disintegration or degradation of the SPR rubber cups. The results of this test indicate that the silicone fluid blends of this example and particularly the silicone fluid of the hydraulic fluid mixture of blend No. 3 of this Example, imparted the proper amount of swelling to rubber and in addition did not disintegrate such rubber material.

The above tests indicate superiority of the hydraulic silicone fluid blends for these examples and particularly of the present invention for the purpose of being used as hydraulic fluids in hydraulic systems and particularly in the hydraulic brake system of an automobile.

EXAMPLE 2

There is prepared a hydraulic fluid mixture blend which is particularly useful for use in the hydraulic brake system of an automobile which blend comprises 90 parts of the dimethylpolysiloxane fluid of Example 1, in combination with 10 parts of a branch chained low viscosity silicone fluid containing 91 mole percent of $(CH_3)_2SiO_{1/2}$ units and 4 mole percent of $CH_3SiO_{3/2}$ units, wherein the viscosity of the fluid is 50 centistokes at 25° C. It was found that when this blend of the two silicone fluids was lowered to −58° C, that it had a viscosity of less than 400 centistokes, showing that such a fluid combination was exceptionally suited for use in arctic climates. The above blend was tested in the dry equilibrium reflux boiling point test discussed in Example 1, and found to have a dry equilibrium reflux boiling point greater than 750° F. It was also tested according to the flash point test of Example 1, and found to have a flash point greater than 500° F.

In the wet equilibrium reflux boiling point test a 100 mm sample of the blend is humidified under control conditions, that is, it is humidified along with 100 mm of the SAE compatibility fluid in an atmosphere having 80% relative humidity. At the end of the humidification period it was found that the fluid of the blend defined in the above Example contained 0.01% by weight of water while the SAE compatibility fluid contained about 3% by weight of water. At the end of the humidification period the humidified hydraulic fluid blend is submitted to the equilibrium reflux boiling determination and it was determined in that test to have a wet equilibrium reflux boiling point in excess of 550° F.

The above blend was also tested in the brake stability test which comprises the high temperature stability test and the chemical stability test which are defined in Example 1. In both these tests, the hydraulic fluid blend defined in this example passed the test in superior manner since there was no change whatsoever in the equilibrium reflux temperature during either of the tests.

The hydraulic fluid blend of this example with the amount of water that it picked up during the humidification in the wet equilibrium reflux boiling point determination also passed the Fluidity and Appearance at Low Temperature test as defined in Example 1. Thus, when such humidified hydraulic fluid blend of this Example was exposed to −40° C, the fluid was clear, there was no gellation, sedimentation, excessive viscosity or thixotropicity and when the sample was reverted the air bubble traveled to the top of the fluid in less than 10 seconds. In all other respects, the hydraulic fluid blend defined above was a superior performing hydraulic fluid particularly with respect to its high temperature stability, and more particularly its high temperature chemical stability.

EXAMPLE 3

There is mixed with 92 parts of the dimethypolysiloxane of Example 1, 8 parts of a glycol polyether of the formula,

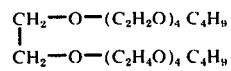

To this mixture of the dimethylpolysiloxane and the glycol polyether there is added 2 parts of dioctyl azelate as a rubber swell additive. Then there is added 0.2 parts of the zinc salts of naphthenic acid. In addition, there is added 2 parts of an anti-oxidant compound having the formula,

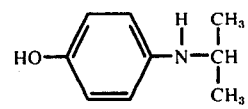

The above hydraulic fluid mixture was tested in accordance with dry equilibrium reflux boiling point test of Example 1, was found to have a dry equilibrium reflux boiling point in excess of 650° F. When the above hydraulic fluid blend is humidified in accordance with the wet equilibrium reflux boiling point determination, it is found to absorb 0.15% by weight of water and with this amount of water in it, it is found to have a wet equilibrium reflux boiling point in excess of 400° F. When the hydraulic fluid blend of this Example was tested in accordance with the flash point determination, defined in Example 1, it is found to have a flash point in excess of 500° F. When the hydraulic fluid blend of this Example is carried through the kineomatic viscosity test, it is found to have a viscosity of less than 600 centistokes at −40° F and a viscosity of this Example is exposed to both the high temperature stability test and the chemical stability test, it is found that there is a negligible change during the test in the equilibrium reflux temperature.

In addition, the hydraulic fluid blend of this example was tested in a corrosion test which comprises polishing, cleaning and weighing six specified metal corrosion test strips and assembyling them. This assembly is placed in a standard rubber whell cylinder cup in a corrosion test jar and immersed in the hydraulic fluid blend of this example which jar is capped and placed in an oven at 100° C for 120 hours. Upon removal and cooling the strips in the fluid cup are examined and tested. The metal test strips are observed for pitting or etching are and whether there are any crystal line deposits which form and adhere to the glass jar walls or the surface of the metal strips and whether there is sedimentation in the fluid-water mixture. The metal strips were weighed for weight loss and other determinations are made with respect to the test. The hydraulic fluid blend of the present example was noted in this test. The metal test strips were observed not to be pitted or etched in any manner and there were not any crystalline deposits which formed or adhered to the glass jar. Also, the surface of the metal strips and in addition there was not any sedimentation in the hydraulic fluid blend of this example after the test.

In so far as the weight loss of the metal strips, the copper strip suffered a weight loss of 0.1 mg., the brass strip suffered a weight loss of 0.1 mg., the iron strip suffered a weight loss of 0.4 mg., the steel strip suffered a weight loss of 0.3 mg., the plated steel strip suffered a weight loss of 0.1 mg. and the aluminum strip suffered no weight loss whatsoever. All these weight losses are entirely acceptable in terms of the hydraulic fluid blend of this example having the proper corrosion resistance when it is to be used as a brake fluid.

The hydraulic fluid blend of this example was also submitted to the fluidity and appearance at low temperature test with the amount of water that it picks up through humidification as described in the wet equilibrium reflux boiling point test. After being subjected to such a test, that is, the fluidity and appearance at low temperature test such as described in Example 1, the hydraulic fluid blend of the present example with the amount of water that absorbs through humidification at 80% Relative Humidity, was found to pass the test quite satisfactorily, that is, it was clear, there was no gellations sedimentation or excessive viscosity or thixotropicity at temperatures as low as −40° C. The hydraulic fluid blend of this Example was then subjected to the water tolerance test as described in Example 1, after 1 and ½% by weight of water had been added to it. It was found that with this amount of water, the fluid of this example appeared clear and there was no stratification or sedimentation, either at the low or high temperatures experienced during the test.

In addition, the hydraulic fluid blend of this example was also subjected to the compatibility test as described in Example 1, and performed satisfactorily in the test.

In addition, the hydraulic fluid blend of this example was subjected to the Styrene Butadiene rubber cups test as disclosed in Example 2 above, that is, four select Styrene Butadiene rubber cups were measured and their hardness determined. Then the cups were placed two to a jar and immersed in the hydraulic fluid blend of the present example, where one jar is heated for 120 hours at 70° C and the other jar heated for 70 hours at 120° C. After this period, the rubber cups are washed and examined for disintegration and hardness, as well as the amount of swell that they have experienced as a result of the test. The results of this test showed that Styrene Butadiene rubber cups expanded or were swollen by the hydraulic fluid blend of the present case by +0.1% by volume, that the hardness of the cups after the test was 15 which was the same value for the hardness for the hardness of the rubber cups prior to the test. In addition, there was no noticeable disintegration or deterioration of the SBR cups as the result of the test.

The above hydraulic fluid blend of this example was also subjected to other types of tests and passed all these tests in a superior manner. These tests as well as the results of these tests detail in the present specification since it is felt that in view of the tests and results already listed above that additional tests and additional test results are not necessary to further exemplify the present invention to the worker skilled in the art. Irrespective of the test results indicated in any of the example set forth, it is seen that the linear silicone fluid of formula 1 is a superior type of hydraulic fluid and more particularly is a hydraulic fluid for the brake system of a vehicle either by itself or with the various types of additives that may be added to it as discussed in the present specification.

We claim:

1. A process for transmitting force through a hydraulic brake system having hydraulic activating means, hydraulic activated means and hydraulic line means connecting said hydraulic activating means with said hydraulic activated means comprising substantially filling said hydraulic activating means, said hydraulic activated means and said hydraulic lines with a hydraulic silicone fluid mixture having acceptable water tolerance and having therein a linear polymer silicone hydraulic fluid of the formula,

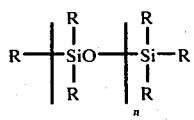

where $n$ varies from 1 to 2000, R is methyl and the viscosity of said fluid varies from 20 to 500 centistokes at 25° C, where there is present at a concentration of 5 to 40% by weight of the total fluid of a water tolerance additive which is selected from the class consisting of compounds of the formula,

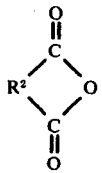

and of the formula,

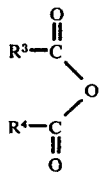

where R² is a divalent hydrocarbon radical selected from the class consisting of alkylene and arylene radicals of 4 to 15 carbon atoms and R³, R⁴ are selected from the class consisting of monovalent hydrocarbon radicals and halogenated monovalent hydrocarbon radicals.

2. The process of claim 1 wherein there is present based on the total fluid 1 to 5% by weight of a rubber swell additive selected from the class consisting of xylene, toluene, mineral spirits, esters of the formula,

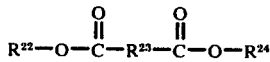

and esters of the formula,

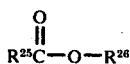

wherein $R^{22}$ and $R^{24}$ are selected from the class consisting of monovalent hydrocarbon radicals and halogenated monovalent hydrocarbon radicals of 4 to 15 carbon atoms, $R^{25}$, $R^{26}$ are selected from the class consisting of monovalent hydrocarbon radicals and halogenated monovalent hydrocarbon radicals of 4 to 15 carbon atoms, and $R^{23}$ is selected from divalent hydrocarbon radicals and halogenated divalent hydrocarbon radicals of 5 to 12 carbon atoms.

3. The process of claim 2, wherein the rubber swell additive is selected from the class consisting of dioctyl azelate, dioctyl adipate and dioctyl sebacate.

4. The process of claim 1, wherein there is present 0.05 to 2% by weight of the total fluid of an anticorrosion additive selected from the class consisting of the zinc salts of naphthenic acid, and a compound of the formula,

where $R^{31}$ is selected from the class consisting of hydrogen and lower alkyl radicals of 1 to 8 carbon atoms, and $R^{30}$ is phenyl.

5. The process of claim 1, wherein there is present 1 to 5% by weight of the total fluid of an antioxidant compound selected from the class consisting of

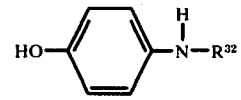

and

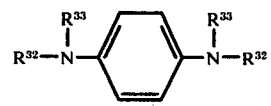

where $R^{33}$ is selected from the class consisting of hydrogen, and lower alkyl radicals of 1 to 8 carbon atoms, $R^{32}$ is a lower alkyl radical of 1 to 8 carbon atoms.

6. The process of claim 1, wherein there is present 0.01 to 2% by weight of the total fluid of an anticorrosion additive comprising a hydrogen polysiloxane of the formula,

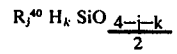

where $R^{40}$ is selected from lower alkyl radicals having 1 to 8 carbon atoms, $j$ is a number that varies from 1.11 to 2.02, $k$ is a number that varies from 0.023 to 1.00, and the sum of $j + k$ varies from 2.024 to 3.00.

7. The process of claim 1, wherein there is present 1 to 20% by weight of the linear fluid polymer of a pour depressant silicone fluid containing 80 to 91 mole percent of $R_2{}^{20}SiO$ units, 5 to 10 mole percent of $R_3{}^{20}SiO_{1/2}$ units, and 4 to 10 mole percent of $R^{20}SiO_{3/2}$ units, wherein the viscosity of said fluid varies from 5 to 100 centistokes at 25° C and $R^{20}$ is selected from the class consisting of monovalent hydrocarbon radicals, halogenated monovalent hydrocarbon radicals and cyanoalkyl radicals.

* * * * *